3,231,604
POLYETHYLENE OXIDE AND POLYPROPYLENE OXIDE PERFLUOROALKYL SUBSTITUTED OXYALKANOATES
Neal O. Brace, Wilmington, Del., assignor to E. I. du Pont de Nemours and Company, Wilmington, Del., a corporation of Delaware
No Drawing. Filed Jan. 23, 1962, Ser. No. 168,253
3 Claims. (Cl. 260—484)

This invention is directed to nonionic surface active agents having the structure $R_fY$ wherein $R_f$ is a perfluoroalkyl group of from three to twenty carbons and Y is a polyether containing group.

Until recently, perfluoroalkyl terminated compounds containing more than a single methylene between the perfluoroalkyl groups and the functional group were not available by any general method of synthesis. Now however, it is possible to prepare compounds having the formula $R_f(CH_2)_nX$, wherein X is a functional group and $n$ is greater than one, said compounds being prepared by the free-radical catalyzed addition of perfluoroalkyl iodides to terminally unsaturated compounds $$CH_2=CH(CH_2)_nX$$

followed by reductive removal of the iodine from the intermediate to give $R_f(CH_2)_{n+2}X$ or dehydroiodination to give $R_fCH=CH(CH_2)_nX$. The functional compounds which may be prepared by this method or from intermediates obtained by this method, and which are also useful as surface active agents, include $$R_f(CH_2)_nO(CH_2)_2CO_2H$$

$R_f(CH_2)_nCO_2H$ and $[R_f(CH_2)_nNR_3]^+X^-$. However, these types of compounds all have ionic functional groups, which under some circumstances is a very undesirable property; there is significant need for nonionic surface active agents with fluorocarbons and hydrocarbon segments.

It is, therefore, an object of this invention to provide novel surface active agents of the types $R_f(CH_2)_nX$ and $R_fCH=CH(CH_2)_nX$ wherein X is a nonionic functional group.

It is another object of this invention to provide novel surface active compounds of the structure $R_f(CH_2)_nX$ and $R_fCH=CH(CH_2)_nX$ wherein X is a polyether containing function.

It is still another object to provide novel methods of synthesis for the heretofore described compounds. These and other objects will become apparent in the following description and claims.

More specifically, this invention is directed to surface active, nonionic fluorine containing compounds having the structure $R_fY$ wherein $R_f$ is a perfluoroalkyl group containing from three to twenty carbons and Y is a polyether containing group having the structure:

(a) $-CH=CH(CH_2)_nOCH_2CH_2CO_2(C_pH_{2p}O)_mH$ or (b) $-(CH_2)_{n+2}OCH_2CH_2CO_2(C_pH_{2p}O)_mH$, $n$ is from one to 18, $m$ is from one to twenty and $p$ is an integer from 2 to 3.

The two types of nonionic surface active agents constituting the present invention are as follows:

(a) $R_fCH=CH(CH_2)_nOCH_2CH_2CO_2(C_pH_{2p}O)_mH$ and (b) $R_f(CH_2)_{n+2}OCH_2CH_2CO_2(C_pH_{2p}O)_mH$. In every case $n$ is from one to 18 and $m$ is from one to twenty. The preferred values of $n$ are from one to nine. The preferred values of $m$ are from three to about ten, $R_f$ is a perfluoroalkyl group which may be either cyclic or acyclic. The acyclic perfluoroalkyl groups are preferred. The perfluoroalkyl group must contain at least three carbons. Those containing less than three carbons are either poor surface active agents or not surface active agents at all. The perfluoroalkyl group may contain up to twenty carbons. However those containing more than twenty carbons serve no useful purpose and are considerably more costly to obtain. The preferred range of perfluoroalkyl groups are those containing from six to about fourteen carbons. The acyclic perfluoroalkyl groups may be straight chain or branched chain groups, the former being preferred. The cyclic perfluoroalkyl groups may contain rings of four to six carbons. The rings may be substituted with acyclic perfluoroalkyl groups. The six membered rings are preferred. The value of $p$ in the above stated formula is 2 or 3, the former is preferred.

The heretofroe described products of the present invention may be prepared by one of the following reaction schemes:

Type (a)

$$R_fCH=CH(CH_2)_nOCH_2CH_2CO_2H + mC_pH_{2p}O \xrightarrow{catalyst}$$

$$R_fCH=CH(CH_2)_nOCH_2CH_2CO_2(C_pH_{2p}O)_mH$$

or $$R_fCH=CH(CH_2)_nOCH_2CH_2CO_2C_pH_{2p}OH + (m-1)C_pH_{2p}O \xrightarrow{catalyst}$$

$$R_fCH=CH(CH_2)_nOCH_2CH_2CO_2(C_pH_{2p}O)_mH$$

Type (b)

$$R_f(CH_2)_{n+2}OCH_2CH_2CO_2H + mC_pH_{2p}O \xrightarrow{catalyst}$$

$$R_f(CH_2)_{n+2}OCH_2CH_2CO_2(C_pH_{2p}O)_mH$$

or $$R_f(CH_2)_{n+2}OCH_2CH_2CO_2C_pH_{2p}OH + (m-1)C_pH_{2p}O$$

The catalyst used may be either a base such as sodium hydroxide, an alkali metal alkoxide such as sodium methoxide or a catalytic amount of the sodium salt of the alcohol or acid rectant or an acidic catalyst, particularly boron trifluoride which is used generally as its diethyl ether complex. Usually basic catalysts give lower values of $m$ while boron trifluoride-etherate can give any value of $m$ desired and particularly the higher values of $m$. Reaction temperatures may vary over a wide range, from 0° C. to 150° C. in most cases. The preferred range is from 80–100° C. Solvents can be and usually are used. Water or simple alcohols are used with the base catalyzed systems but inert solvents such as hydrocarbons are best used with the boron trifluoride catalyst. Since boron trifluoride reacts readily with water, the reactants and equipment should be dry when boron trifluoride is used as the catalyst of the reaction. Usually, a small excess of alkylene oxide is used with the base catalyzed systems but not in the boron trifluoride catalyzed system.

In most cases, the reactants and catalyst are placed in a reaction vessel and the desired amount of alkylene oxide is added to the mixture either at ambient temperature or at elevated temperatures. The mixture is heated under a refrigerated reflux condenser or in a pressure system until the reaction is complete. Any solvent and unreacted starting materials are then removed by distillation or evaporation. The resulting product mixtures may be separated if desired but are generally used without further purification since mixtures, when obtained, are equally useful as surface active agents as are the pure species.

In the above products and reactions, $$C_pH_{2p}O$$

represents ethylene oxide or propylene oxide. These two epoxides undergo these reactions with equal facility and give products which are very similar. They differ, of course, in some respects because those prepared from propylene oxide will have somewhat more hydrocarbon character than those prepared from ethylene oxide. Since the primary function of the polyether group is to increase water solubility, ethylene oxide is preferred for preparing these products. The propylene oxide products are however quite useful surface active agents, having many of the same uses as those prepared from ethylene oxide.

The starting materials for the type (a) products [$R_fCH=CH(CH_2)_nOCH_2CH_2CO_2H$] may be prepared as follows:

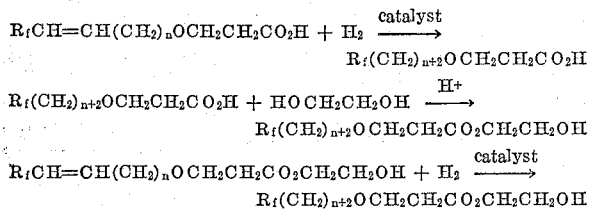

The starting materials for the type (b) products [$R_f(CH_2)_{n+2}OCH_2CH_2CO_2H$] may be prepared as follows:

$$R_fCH=CH(CH_2)_nOCH_2CH_2CO_2H + H_2 \xrightarrow{catalyst}$$
$$R_f(CH_2)_{n+2}OCH_2CH_2CO_2H$$

$$R_f(CH_2)_{n+2}OCH_2CH_2CO_2H + HOCH_2CH_2OH \xrightarrow{H^+}$$
$$R_f(CH_2)_{n+2}OCH_2CH_2CO_2CH_2CH_2OH$$

$$R_fCH=CH(CH_2)_nOCH_2CH_2CO_2CH_2CH_2OH + H_2 \xrightarrow{catalyst}$$
$$R_f(CH_2)_{n+2}OCH_2CH_2CO_2CH_2CH_2OH$$

A wide variety of prefluoroalkyl iodides $R_fI$ are available for use in the heretofore described reactions, e.g.

$CF_3(CF_2CF_2)_nI$, $n=0$ to 12, Haszeldine, Nature, 167, 139 (1951); J. Chem. Soc., 2856 (1949); 3761 (1953). $CF_3CF_2CF_3[CF_2CF(CF_3)]_nI$, Hauptschein, J.A.C.S., 79, 2549 (1957).

$CF_3[CF_2CF(CF_3)]_nI$, $CF_3(CF_2)_3[CF_2CF(CF_3)]_n$ $(CF_3)_2CF[CF_2CF(CF_3)]_nI$, Hauptschein, French 1,223,-259.

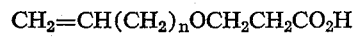  $CFI$, $n=3-5$, Hauptschein, U.S. 2,975,220.

The iodides $R_fCH_2I$ are described in U.S. 2,972,638 and the sulfonyl chlorides $R_fSO_2Cl$ in U.S. 2,950,317.

Many acids $CH_2=CH(CH_2)_nCO_2H$ are known to the art. U.S. 2,951,051 describes the series. The acids $$CH_2=CH(CH_2)_nOCH_2CH_2CO_2H$$

are known in the art.

The products of the present invention are excellent surface active agents in aqueous solutions. Unlike the ionic types, the surface active compositions of this invention are not affected by the pH of the solution. Cationic types, which are usually ammonium salts, are often adversely affected by high pH while anionic types are often adversely affected by low pH. The surface active compositions of this invention have a variety of uses. A typical few are: formation of emulsions, leveling agents in floor wax emulsions, emulsification of fluorohalocarbon propellents in aqueous aerosol systems, emulsification of aqueous materials in fluorohalocarbon propellent systems, emulsifiers for emulsion polymerizations and the like. These compounds also impart water and oil repellency to surfaces on which they are adsorbed. Many other uses will be apparent to those skilled in the art.

The following representative examples are given to illustrate the preparation of the compositions of this invention and are not intended in any way to limit the scope of this invention. All parts are by weight unless otherwise stated.

EXAMPLE 1

$CF_3(CF_2)_5I$ was caused to react with $$CH_2=CHCH_2OCH_2CH_2CO_2H$$

in the presence of azobisisobutyronitrile at a temperature between 88 and 100° C. for 3 hours. Thereafter additional azonitrile was added to the reaction and the reaction mixture heated at 80 to 90° C. for 17 hours. Distillation of the reaction mixture gave the product $$CF_3(CF_2)_5CH_2CHICH_2OCH_2CH_2CO_2H$$

(78% conversion). *Analysis.*—Calcd.: I, 22.0. Found: I, 20.0. Reaction with potassium hydroxide in 90% ethanol was carried out with agitation at 60° C. for 1.5 hours. The reaction mixture was then extracted with methylene chloride and ether. The combined organic solution was dried over anhydrous magnesium sulfate and evaporated. Distillation gave $$CF_3(CF_2)_5CH=CHCH_2OCH_2CH_2CO_2H$$

B.P. 120–121° C./1 mm.; $n_D^{25}$ 1.3574. *Analysis.*—Calcd.: C, 32.3; H, 2.0; equiv. wt., 465. Found: C, 32.3; H, 2.0; equiv. wt., 448.2. Reduction with hydrogen at 45 p.s.i. using platinum oxide catalyst gave $$CF_3(CF_2)_5(CH_2)_3OCH_2CO_2H$$

(82%), B. P. 110° C./0.5 mm. *Analysis.*—Calcd.: C, 32.0; H, 2.46. Found: C, 32.2; H, 2.2.

Five parts of $CF_3(CF_2)_5(CH_2)_3OCH_2CH_2CO_2H$, 4.7 parts of ethylene oxide, 4 parts of benzene and 0.05 part of boron trifluoride etherate were caused to react for 2 hours at 60–67° C. by bubbling the ethylene oxide into the reaction mixture. The reaction vessel was fitted with a condenser, a pressure seal (1 inch of mercury) and a trap cooled with solid carbon dioxide. The reaction mixture was heated at 82 to 85° C. for 5 hours. Evaporation of the solvent, followed by extraction with water, gave 7.8 parts of $$CF_3(CF_2)_5(CH_2)_3OCH_2CH_2CO_2(CH_2CH_2O)_mH$$

where $m$ has an average value of 6.0. *Analysis.*—Calcd.: C, 40.4; H, 5.0; molec. wt. 714. Found: C, 39.5; H, 4.8; molec. wt., 733. The following surface tensions of aqueous solutions were found.

| Conc. (wt. percent): | Surface tension, dynes/cm. |
|---|---|
| 1.0 | 16.8 |
| 0.25 | 16.6 |
| 0.125 | 16.8 |
| 0.063 | 16.8 |
| 0.031 | 17.0 |
| 0.016 | 21.3 |
| 0.10 (a) | 19.0 |
| 0.10 (b) | 17.6 |

$a=$ in 0.05 N NaOH.
$b=$ in 0.05 N HCl.

EXAMPLE 2

$CF_3(CF_2)_6I$ was caused to react with $$CH_2=CH(CH_2)_2CO_2H$$

using the procedure of Example 1, giving $$CF_3(CF_2)_6CH_2CHI(CH_2)_2CO_2H$$

M.P. 76–77° C. Reaction with alcoholic potassium hydroxide gave $CF_3(CF_2)_6CH=CH(CH_2CO_2H$ in 85% over-all yield, B.P. 138° C./3 mm., M.P. 24–26.5° C. *Analysis.*—Calcd., C, 30.8; H, 1.51; F, 60.9; acid No. 119.6. Found: C, 30.8; H, 1.6; F, 61.5; acid No. 111.

Two parts of the above acid, 4.4 parts of ethylene oxide and 0.05 part of boron trifluoride etherate in 4 parts of dry benzene were caused to react at 61–73° C. for 3 hours following the procedure of Example 1, giving 3.9 parts of $$CF_3(CF_2)_6CH=CH(CH_2)_2CO_2(CH_2CH_2O)_mH$$

wherein $m$ had an average value of 10 (from wt. increase). *Analysis.*—Calcd.: C, 42.2; H, 5.2; F, 31.4. Found: C, 40.2; H, 5.0; F, 32.8.

The surface tension of a 0.025% by wt. solution at 25° C. was 18.0 dynes/cm.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is understood that this invention is not limited to the specific embodiments thereof except as defined in the appended claims.

The embodiments of the invention in which an exclusive property or privilege is claimed are defined as follows:

1. Surface active, nonionic fluorine-containing compounds of the structure $R_fY$ wherein $R_f$ is a perfluoroalkyl group containing from three to twenty carbons and Y is a polyether-containing group having the structure selected from the group consisting of (*a*) $-CH=CH(CH_2)_nOCH_2CH_2CO_2(C_pH_{2p}O)_mH$, and (*b*) $-(CH_2)_{n+2}OCH_2CH_2CO_2(C_pH_{2p}O)_mH$, wherein $n$ is from one to eighteen, $m$ is from one to twenty and $p$ is an integer from 2 to 3.

2. A surface active, nonionic fluorine containing compound of the structure $$CF_3(CF_2)_5(CH_2)_3OCH_2CH_2CO_2(CH_2CH_2O)_6H$$

3. A surface active nonionic fluorine containing compound of the structure $$CF_3(CF_2)_6CH=CH(CH_2)_2OCH_2CH_2CO_2(CH_2CH_2O)_{10}H$$

References Cited by the Examiner
UNITED STATES PATENTS

| | | |
|---|---|---|
| 2,615,853 | 10/1952 | Kirkpatrick et al. |
| 2,723,999 | 11/1955 | Cowen et al. _____ 260—615 |
| 2,796,401 | 6/1957 | Matuszak et al. ___ 260—615 X |
| 2,950,313 | 8/1960 | Kirkpatrick _____ 260—484 |
| 2,979,533 | 4/1961 | Bruson. |

LORRAINE A. WEINBERGER, *Primary Examiner.*

LEON ZITVER, *Examiner.*